(12) United States Patent
Roth et al.

(10) Patent No.: US 7,222,822 B2
(45) Date of Patent: May 29, 2007

(54) LINEAR ACTUATION DEVICE FOR SPACECRAFT AND SOLAR GENERATOR UNFOLDING SYSTEMS

(75) Inventors: Martin Roth, Falkenstrasse (DE); Leonhard Stielner, Fuss (DE); Axel Söckle, Am Scheirer Feld (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 10/928,405

(22) Filed: Aug. 30, 2004

(65) Prior Publication Data

US 2005/0039557 A1 Feb. 24, 2005

Related U.S. Application Data

(63) Continuation of application No. 09/894,138, filed on Jun. 29, 2001, now Pat. No. 6,997,416.

(30) Foreign Application Priority Data

Jun. 29, 2000 (DE) ............................ 100 43 631

(51) Int. Cl.
*B64G 1/44* (2006.01)

(52) U.S. Cl. ..................................... 244/173

(58) Field of Classification Search ............... 244/173, 244/158 R; 74/424.78, 441, 89.23, 89.36, 74/424.81, 424.91, 424.92
See application file for complete search history.

(56) References Cited

U.S. PATENT DOCUMENTS

| 1,444,393 | A |   | 2/1923  | Schonfield |          |
|-----------|---|---|---------|------------|----------|
| 3,540,676 | A |   | 11/1970 | Madey      |          |
| 3,965,761 | A |   | 6/1976  | Stanley    |          |
| 3,981,467 | A |   | 9/1976  | Ludlow     |          |
| 4,347,023 | A |   | 8/1982  | Rizos      |          |
| 4,396,096 | A | * | 8/1983  | de Groot et al. | ............ 188/134 |
| 4,501,981 | A |   | 2/1985  | Hansen     |          |
| 4,641,798 | A |   | 2/1987  | De Haan et al. |      |
| 4,779,826 | A |   | 10/1988 | Kiendl     |          |
| 5,263,381 | A |   | 11/1993 | Shirai     |          |
| 5,603,595 | A |   | 2/1997  | Nygren, Jr. |         |
| 5,731,640 | A |   | 3/1998  | Dietrich et al. |     |
| 5,865,272 | A | * | 2/1999  | Wiggins et al. | ........... 185/40 R |
| 6,073,914 | A |   | 6/2000  | Roth et al. |         |
| 6,189,391 | B1|   | 2/2001  | Wittenstein et al. |  |

FOREIGN PATENT DOCUMENTS

| DE | 2734530  | 2/1979  |
|----|----------|---------|
| DE | 4208126  | 11/1993 |
| DE | 19649739 | 6/2000  |
| EP | 0603067  | 8/1994  |

\* cited by examiner

OTHER PUBLICATIONS

Lucy et al., "Report on Alternative Devices to Pyrotechnics on Spacecraft," 10$^{th}$ Annual AIAA/USU Conference on Small Satellites, 1996, pp. 1-19.

*Primary Examiner*—Tien Dinh
(74) *Attorney, Agent, or Firm*—Crowell & Moring LLP

(57) ABSTRACT

A linear operating device is provided that includes a way of converting a rotational motion into a translational motion, realized in the form of a nut, a rotating drive unit and a spindle acting in conjunction with the nut; and the nut is connected to the spindle with the ability to rotate. The rotating drive unit is connected to the nut with torsional strength, or it exercises a force in the axial direction of the spindle. Applications for the invention can be found in space travel, particularly in the context of solar generator unfolding systems.

18 Claims, 4 Drawing Sheets

LINEAR ACTUATION DEVICE FOR SPACECRAFT AND SOLAR GENERATOR UNFOLDING SYSTEMS

BACKGROUND AND SUMMARY OF THE INVENTION

This application claims the priority of German Patent Document 100 43 631.5, the disclosure of which is expressly incorporated by reference.

The present invention relates to a linear operating device that includes a medium for converting a rotational motion into a translational motion, which is realized as a nut, a rotating drive unit and a spindle, which acts in conjunction with the nut; and the nut is connected with the spindle in such a manner that it maintains its ability to rotate.

A linear operating device of this type is known from European Patent Document EP 0 603 067. This linear operating device is envisioned particularly for use on spacecraft. In this instance the nut is realized as a thread rolling mechanism. The spindle is connected with torsional strength to a rotating drive unit.

As an alternative to the thread rolling mechanism referred to above, a ball nut is known from German Patent Document DE 42 08 126 and corresponding U.S. Pat. No. 5,263,381, which also acts in conjunction with a spindle to convert a rotational motion into a translational motion.

In the context of the present state of the art in accordance with European Patent Document EP 0 603 067, the spindle of the linear drive is always connected to the rotating drive unit. Elements that are connected with the nut can be moved in a translational way in relation to the spindle, or, in the extreme consequence, they can even be detached from the spindle. However, this is accompanied by the risk that with larger elements that are to be moved in a translational manner or with elements that are to be connected temporarily with the spindle it will be necessary to use a spindle that is correspondingly large and that will, after release of the connection between the nut and the spindle, remain as a relatively large and disturbing element on the rotating drive unit and possible other components that are attached to the rotating drive unit. With regard to the example of the unfolding of a solar generator on a spaceship, this would mean that after the solar generator has been unfolded a relatively long spindle would stick out from the surface of the spaceship that could obstruct the movement of the solar generator, or even cause damage to the solar generator.

Specifically, with respect to the case of an unfolding system for solar generators, different construction types are known from German Patent Document DE 196 49 739 and corresponding U.S. Pat. No. 6,073,914, but they are associated with certain disadvantages. A pyrotechnical release entails the problem that a relatively high shock acts upon the solar generator unit and/or on the structures carrying it, which would, in spacecraft applications, cause considerable disturbances. In addition, there exists a risk of particles flying about that can result in damage to the solar generator apparatus or other mechanisms. German Patent Document DE 196 49 739 also discloses non-pyrotechnical release devices. However, these devices are also associated with the risk of particles flying about or with the risk, as in the embodiment claimed in German Patent Document DE 196 49 739, of a jam-up. Consequently, a failure to release cannot be precluded.

It is therefore an object of the present invention to provide a linear operating device that will remedy the disadvantages of the state of the art referred to above and that allows, particularly in the context of the application in space travel, operation without shock effect or particles flying about.

The objective is achieved with the rotating drive unit being rotatably fixed to the nut or the rotating drive unit exercising a force in an axial direction of the spindle on an area of the spindle that acts in conjunction with the nut. Other certain preferred embodiments of the present invention include a spacecraft and a solar generator unfolding system featuring a linear operating device.

The linear operating device preferentially includes a rotating drive unit rotatably fixed to the nut. Consequently, by way of a rotational motion of the nut, which is caused by the rotating drive unit, it is possible to generate a translational motion of the spindle, which, in the ultimate consequence, will result in the detachment of the spindle from the nut. This way, the spindle, that may be very long, no longer stays on the rotating drive unit and the components attached to it. The rotating drive unit can be realized, for example, as a motor or as a spring.

In further certain preferred embodiments, it is also possible to envision as an alternative or in conjunction with the preferred embodiments referred to above that one (or, if need be, another or even several) rotating drive unit(s) exercise(s) a force in the axial direction of the spindle in that area of the spindle that acts in conjunction with the nut. Thus, it is possible to cause the nut to rotate, solely by or supported by the effect of this tensile load or pressure load, which effects in turn a translational movement of the spindle. In this case, the rotating drive unit can be realized as an elastic element.

In particular in certain preferred embodiments, it can be envisioned that the spindle is realized as pre-stressed and extensible. To be considered in this context are all kinds of suitable materials and construction types for the spindle, which, obviously, must be adjusted to the respective pre-stress. The spindle can be manufactured, for example, from titanium or steel in order to absorb high pre-stresses, and it can be manufactured as a solid element or as individual elements, such as fibers or rods, in order to provide a correspondingly lower or higher level of elasticity. Other suitable materials, for example non-metallic materials, or other construction types are also possible.

On the other hand, in certain preferred embodiments, it is also possible to envision, in the alternative or in addition, that at least one elastic element, for example a spring element, is envisioned as rotating drive unit, which exercises a pre-stress, i.e. a tensile load or a pressure load, on the spindle. Thus, analogous to the previous description, this elastic element is then able to cause the nut to rotate by way of applying the tensile load or pressure load upon the spindle.

In certain preferred embodiments, the nut has an operative connection with the spindle via rolling bodies. This ensures that during the rotational motion of the nut, with regard to the spindle, only the rolling resistance must be overcome, but no sliding resistance occurs between the nut and the spindle. Envisioned as suitable rolling bodies can be, for example, rollers or balls that are known from the state of the art referred to previously.

In certain preferred embodiments, in order to stop the nut before it executes the rotational motion, it is possible to envision a lock device, where the nut is attached to a first lock device rotatably fixed. This lock device can be part of the nut itself, but it is also possible to envision another element to which the nut is suitably attached with torsional strength. The first lock device is realized in such a way that it can be connected, detachably and rotatably fixed, to a complementary lock device. This way it can be guaranteed that, provided both lock devices are in a stop position, they are arresting any rotational motion of the nut, and after the lock devices are released from each other the nut is able to execute the desired rotational motion. To accomplish this, the first lock device can be equipped with a projection or a recess on its surface, while the complementary lock device features a form that is complementary to the projection or the recess. The only requirement for this complementary form is that it is realized appropriately in such a way that it can act effectively in conjunction with the projection or the recess in order to block any undesired rotating of the nut.

To ensure tension-free operation of the linear operating device, it can be envisioned that the spindle and the nut are arranged in mountings with the ability to tilt. This way it is possible to make adjustments for any mutual displacement of the mountings of spindle and nut. Consequently, the mountings are realized in a suitable form, preferentially as ball-and-socket joint or in another appropriate way.

This linear operating device can be used in all instances where items must be connected in such a way that they are displaceable in relation to each other, and particularly where items are to be detachably connected with each other and are to be released subsequently, e.g. released within the meaning of opening, extending, folding out or separating. Thus, this is a device that provides a solid connection in its reeled-in condition which can then be easily released, particularly by also applying remote activation.

In other certain preferred embodiments of the present invention, a spacecraft is equipped with the linear operating device described previously. The rotating drive unit can, for example, be connected to the spacecraft, and the spindle can be connected to detachable, extendable or unfoldable mechanisms of the spacecraft. Devices of this type can be, for example, solar generator units or antenna devices of the spacecraft, other masts, landing legs, loads that are to be put out, several spacecrafts (for example, satellite piles) or even a parent or secondary spacecraft that is to be separated from the other craft, respectively.

In certain preferred embodiments of the present invention, a solar generator unfolding system is equipped with the linear operating device described above. In this instance, the linear operating device can be envisioned particularly as part of a hold-down and release system for unfolding a solar generator unit.

In certain preferred embodiments, it can be envisioned that the nut is connected to a supporting structure of the solar generator unit and that the spindle is connected to an outermost panel element of the solar generator unit. This way it is possible to ensure that upon unfolding of the solar generator unit the spindle will be removed from the supporting structure, e.g. a solid frame, a vehicle, a spacecraft etc., so that it cannot be the cause of disruptions at that location.

To guarantee tension-free operation it is possible to envision that the spindle is arranged in a first mounting with the ability to tilt vis-à-vis the outermost panel element of the solar generator unit, and the nut is arranged in a second mounting with the ability to tilt vis-à-vis the support structure. Thus, any possible displacement of the solar generator unit vis-à-vis the support structure can be compensated for in a simple manner.

Preferred embodiments of the present invention are subsequently described in more detail using the FIGS. 1 to 6.

Other objects, advantages and novel features of the present invention will become apparent from the following detailed description of the invention when considered in conjunction with the accompanying drawings.

DETAILED DESCRIPTION OF THE EMBODIMENTS

Figure 1:
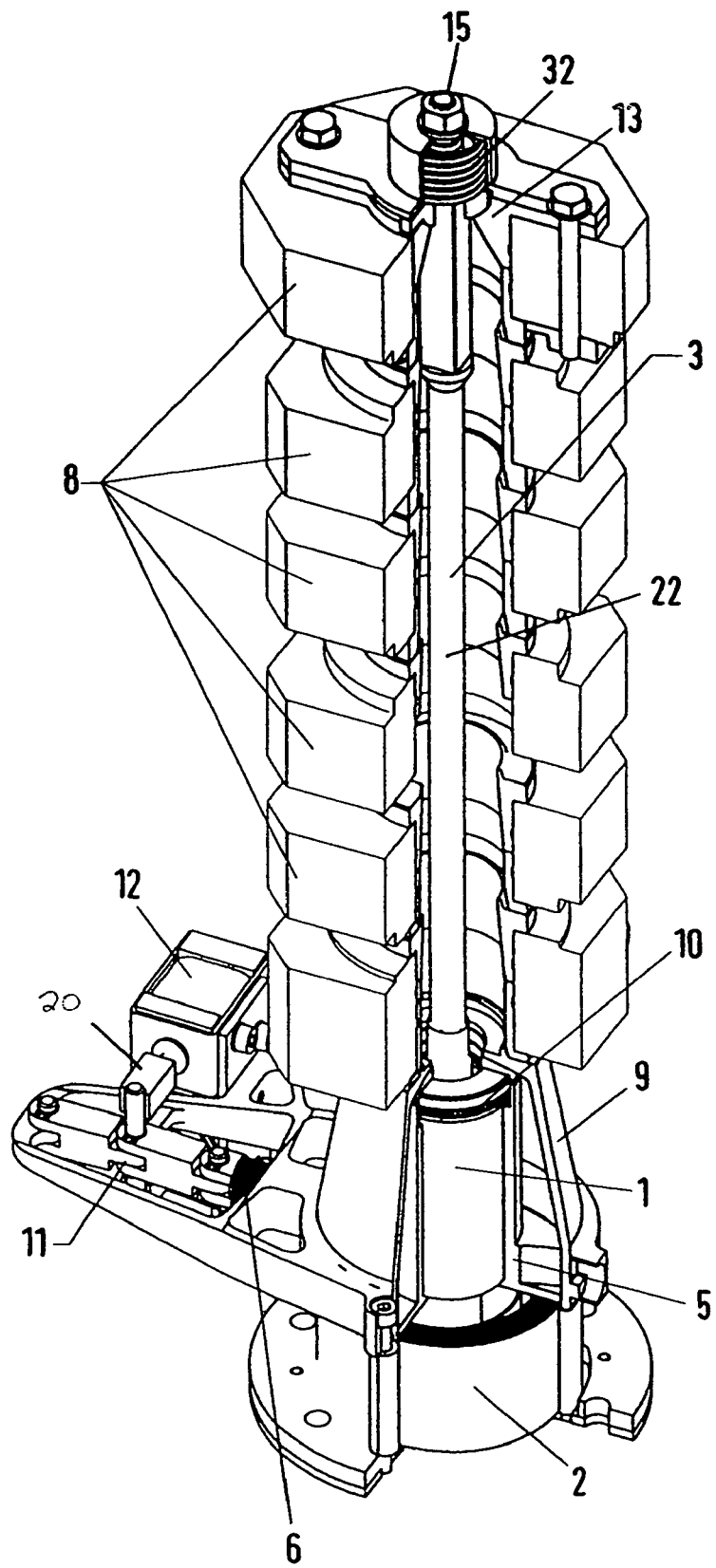
FIG. 1 shows a plain view of a solar generator unfolding system, including a linear operating device according to certain preferred embodiments of the invention.

FIG. 1 shows a linear operating device according to a preferred embodiment of the invention that is part of a solar generator unfolding system, a spacecraft, for example. This apparatus includes a nut 1 that is used to detachably anchor a spindle 3. Subject to a pre-stress, a solar generator unit 8 is held together and/or held down over this spindle 3. FIG. 1 indicates sections of individual panel elements of the solar generator unit 8. The spindle 3 is connected with torsional strength by way of a corresponding connecting element 13, for example a ball cup, with the solar generator unit. The connecting element 13 can be aligned in such a way that it is possible to apply via the spindle 3 a tensile stress as pre-stress, which is intended to hold solar generator unit 8 together and/or down. This pre-stress can be applied, for example, by way of another nut 15 to the one end of the spindle 3, while on its other end the spindle 3 is fastened inside the nut 1.

The amount of the pre-stress can be selected in such a way that spindle 3 undergoes an extension. This will turn the spindle into a rotating drive unit 22, because, as soon as the nut 1 allows it, the spindle 3 will attempt to re-contract thereby causing the nut 1 to rotate, which in turn causes the spindle 3 to be moved out of the nut 1 in the form of a linear motion. If the spindle 3 is a solid material, the expansion will occur along its entire length. However, it is also possible for the spindle 3 to have a certain elasticity only in a partial area with that area being, for example, a more elastic material or of a different structure, such as individual elements (e.g. fibers, rods etc.).

In the alternative or to support this pre-stress effect resulting from the extension of the spindle 3, it is possible to envision one or several springs 32 that exercise a pre-stress on the spindle 3 itself, and the pre-stress is then passed along to the nut 1 via the spindle 3. Thus, using a measure such as this it is also possible to set the spindle 3 under a pre-stress vis-à-vis the nut 1. Again, a tensile load is applied that causes the nut 1 to rotate as soon as the nut allows this to occur, whereby, consequently, the spindle 3 is moved out of the nut 1 in the form of a linear movement. Thus, in this case the spring 32 constitutes a rotating drive unit. However, instead of a spring 32 that applies a tensile load, it is also possible to envision a suitable elastic element that applies a pressure load on the spindle 3 and that acts upon the spindle 3, for example, on the end of the spindle that is directed toward the nut 1. This would mean that the spindle 3 is not partially pulled out of the nut 1, but instead it is partially pushed out in order to cause the nut 1 to rotate, which will cause the spindle 3 to be finally completely moved out of the nut 1.

A further alternative or additional possibility to effect such a moving-out motion of the spindle 3 from inside of the nut 1 envisions a rotating drive unit 2 that is rotatably fixed to the nut. This will be described in more detail later.

Therefore, by rotating the nut 1 it is possible to generate a translational motion of the spindle 3 that will ultimately lead to the separation of the spindle 3 from the nut 1, consequently causing the release of the composite unit including spindle 3 and solar generator unit 8, connected to the spindle via the connecting element 13, from the hold-down system, which is formed by the nut and the components connected to it.

Figure 5:
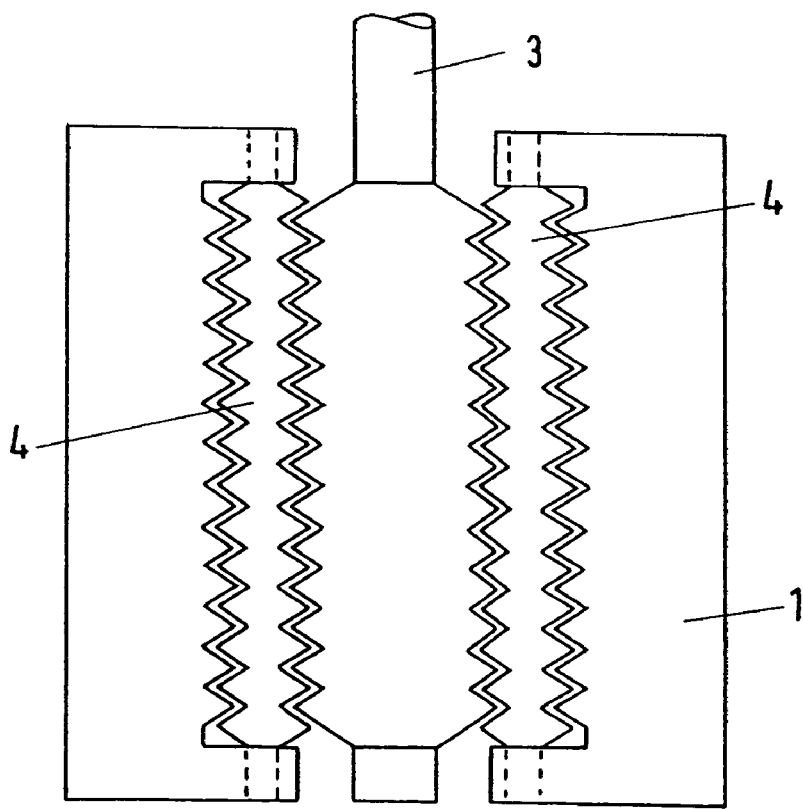
FIG. 5 shows a cross section of one of the nuts, which is realized as a ball nut.

The nut 1 can be realized, as shown for example in FIG. 5, as a roller nut, i.e. the nut 1 is equipped with rollers 4 that establish in turn the operative connection with the spindle 3, which is threaded, like the rollers 4, at least along a section of its length.

Figure 3:
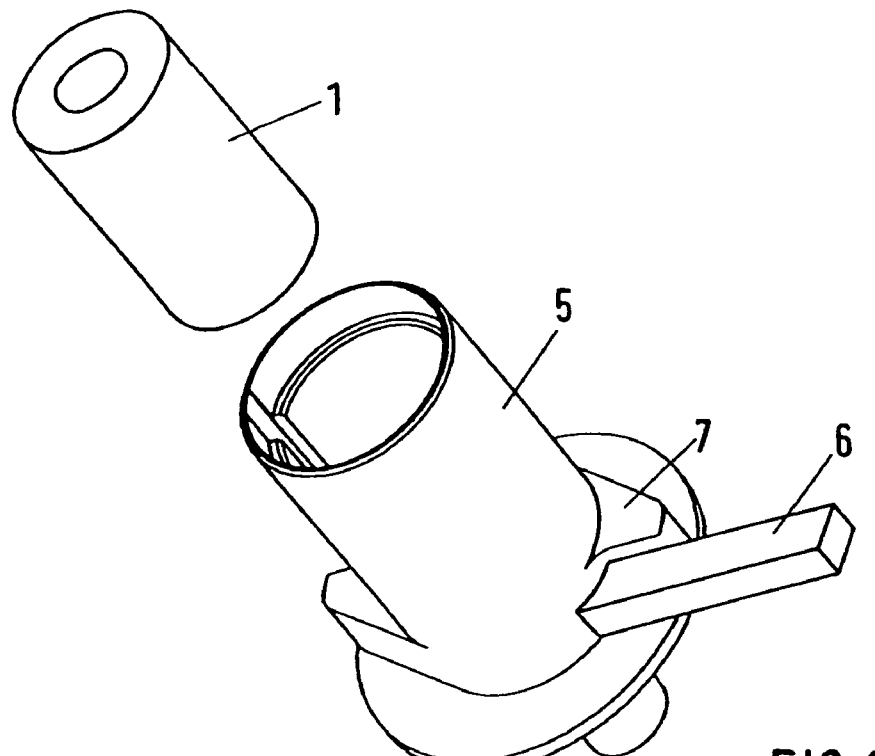
FIG. 3 shows a schematic depiction of the nut, including a lock device.

To prevent any undesired rotational motion of the nut a stop mechanism including a lock device 5 is envisioned, which is depicted in FIG. 3. In the present example, this is a sleeve 5 into which the nut 1 is fitted rotatably fixed. In an area of its surface, the sleeve 5 features a projection 7 that allows for blocking the rotational motion of the composite unit including the sleeve 5 and nut 1 by way of a second lock device 6, for example a rod, a bolt etc.

Figure 2:
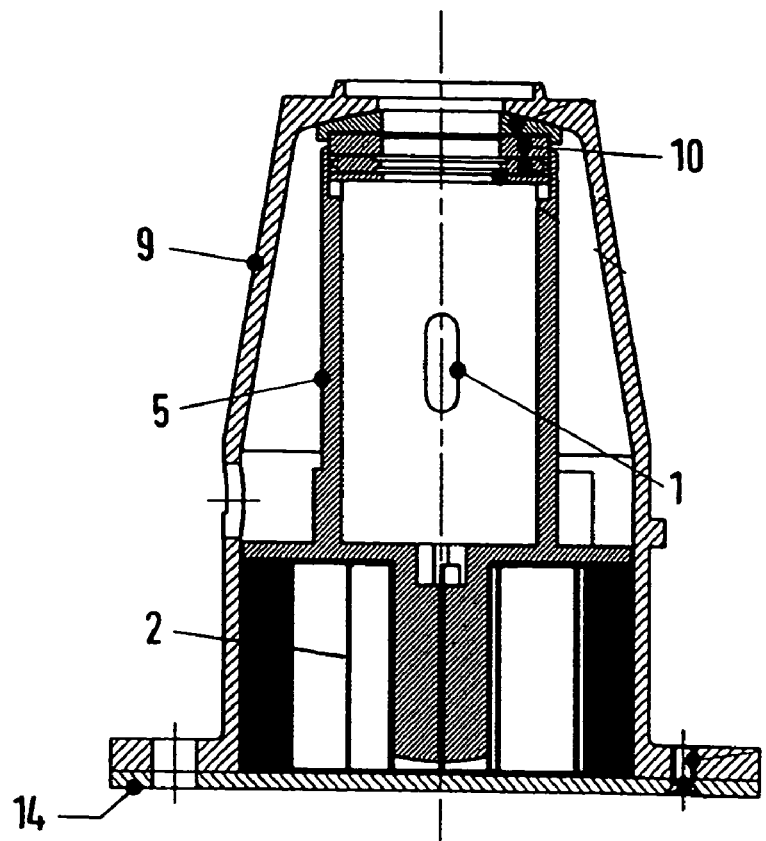
FIG. 2 shows a cross section of the hold-down mechanism for the spindle of the unfolding system in accordance with FIG. 1.
Figure 4:
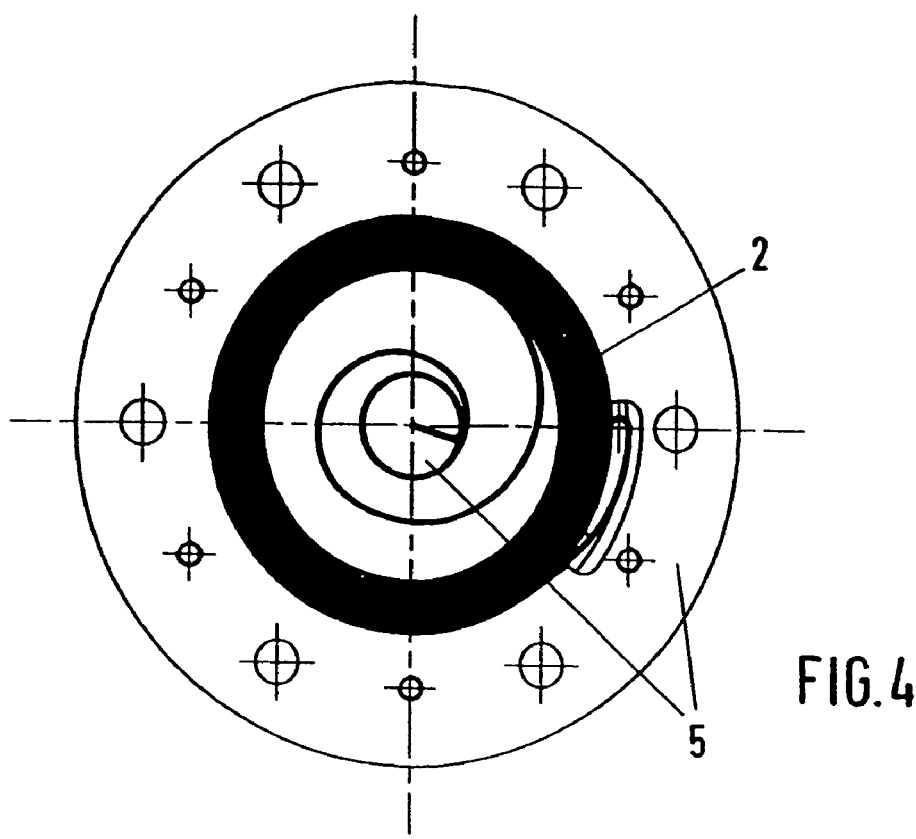
FIG. 4 shows a view of the connection of a spring as rotating drive unit with the nut.

As can be seen in FIGS. 1, 2 and 4, the sleeve 5 is connected rotatably fixed to a rotating drive unit 2, which is realized as a spring 2 in the present case. In the present example, a spiral spring 2 is envisioned for this purpose that is in a pre-stressed condition before the nut 1 performs the rotational motion. After the stop is released, i.e. the lock devices 6 and 7 are detached from each other, it effects, due to its relaxing, a rotational motion of the sleeve 5 which entails therefore also a rotational motion of the nut 1 that is attached to the sleeve 5. The other rotating drive units 22, 32 can be envisioned, as has been outlined previously, as alternative or additional rotating drive units. For the purpose of simplifying the depiction in FIG. 1, all three types of rotational drive units 2, 22, 32 are shown together.

In order to guarantee a safe rotational motion the aggregate unit of the nut 1, sleeve 5 and spiral spring 2 is arranged, as shown in FIG. 2, inside a housing 9 that is connected to a floor plate 14 or e.g. directly to the surface of the spacecraft. To reduce friction during the rotational motion of the sleeve 5 and of the nut 1 inside the housing 9 a corresponding bearing 10, for example a roller bearing, is envisioned between the sleeve 5 and the housing 9 in the upper area of the housing.

The two lock devices 6, 7 can be detached from one another using any kind of suitable device. The example in FIG. 1 envisions correspondingly that the lock device 6 is realized as a bolt connected to a traveler 20 via a toggle joint 11; and the traveler 20 can be moved, for example, using an actuator 12, such as a motor or a solenoid. The translational motion of the traveler 20 is converted via the toggle joint 11 to a translational motion of the bolt 6 which becomes detached from the projection 7 during this movement, thereby releasing the rotational motion of the sleeve 5 and of the nut 1 that is attached with the sleeve 5. It is also possible to use other suitable devices as lock device 6 or actuator 12, such as shape memory alloys, etc.

Figure 6:
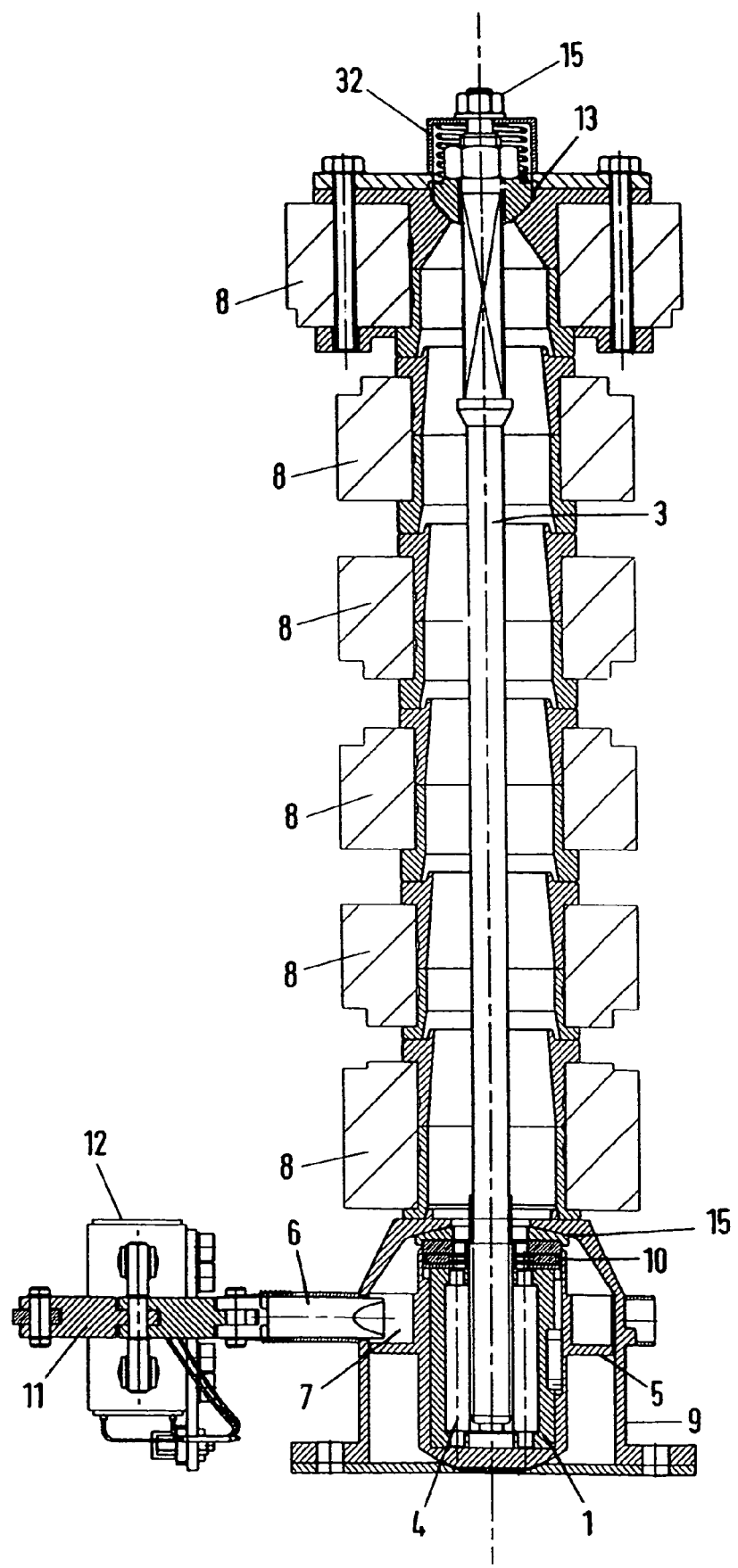
FIG. 6 shows a cross section of the apparatus in accordance with FIG. 1.

FIG. 6 shows, once again, a cross section of the apparatus according to FIG. 1, and the elements of the linear operating device described in the context of FIG. 1 are also seen again in FIG. 6. Only the depiction of the spring 2 has been left out; as described previously, depending on the embodied example, this spring is not necessary. But, the depiction according to FIG. 6 emphasizes one detail in particular. Ball-and-socket joints are envisioned for arranging the spindle in the upper area, on the one hand, and for arranging the nut 1 and the sleeve 5 in the housing 9, on the other hand. They compensate for any displacement at these two mounting points in relation to each other, i.e. a slanted position of the spindle, which is why despite such a displacement no tension results in the context of the apparatus, and particularly in the context of the spindle 3 as well as its mounting points.

Rather, the spindle 3 can be tilted vis-à-vis the uppermost solar generator unit 8 in the upper mounting as connecting element 13 in the same manner as the sleeve 5 with the nut 1 vis-à-vis the housing 9 in the mounting 15 in the upper area of the housing 9. This guarantees stress-free operation of this apparatus until such a time that the spindle 3 is completely detached from the nut 1.

The foregoing disclosure has been set forth merely to illustrate the invention and is not intended to be limiting. Since notification so the disclosed embodiments incorporating the spirit and substance of the invention may occur to persons skilled in the art, the invention should be construed to include everything within the scope of the appended claims and equivalents thereof.

What is claimed is:

1. Linear operating device having a converter for converting a rotational motion into a translational motion, said converter comprising a nut, a spring device and a spindle, acting in conjunction with the nut, and the nut being rotatably attached to the spindle, wherein the spring device exercises a force in an axial spindle release direction on an area of the spindle which acts in conjunction with the nut to cause a rotation force to be applied to the nut, and the force is exercised over an axial distance sufficient to permit the spindle to separate from the nut.

2. Linear operating device according to claim 1, wherein the spindle is extensible while subject to a pre-stress.

3. Linear operating device according to claim 2, wherein the nut has an operative connection with the spindle via rolling bodies.

4. Linear operating device according to claim 2, wherein the nut is connected rotatably fixed to a first lock device which is connectable, detachably and rotatably fixedly, to a complementary lock device.

5. Linear operating device according to claim 1, wherein the nut has an operative connection with the spindle via rolling bodies.

6. Linear operating device according to claim 5, wherein the rolling bodies are rollers or balls.

7. Linear operating device according to claim 6, wherein the nut is connected rotatably fixed to a first lock device which is connectable, detachably and rotatably fixedly, to a complementary lock device.

8. Linear operating device according to claim 7, wherein the first lock device has a projection or a recess on a surface, and wherein the complementary lock device has a form which is complementary to the projection or the recess.

9. Linear operating device according to claim 5, wherein the nut is connected rotatably fixed to a first lock device which is connectable, detachably and rotatably fixedly, to a complementary lock device.

10. Linear operating device according to claim 1, wherein the nut is connected rotatably fixed to a first lock device which is connectable, detachably and rotatably fixedly, to a complementary lock device.

11. Linear operating device according to claim 10, wherein the first lock device has a projection or a recess on a surface, and wherein the complementary lock device has a form which is complementary to the projection or the recess.

12. Linear operating device according to claim 1, wherein the spindle and the nut are arranged in respective mountings which are tiltable.

13. The linear operating device according to claim 1 wherein there is a complete separation between the nut and the spindle after rotation of said nut.

14. A linear operating device having an assembly for converting a rotational motion into a translational motion, said assembly comprising:
   a spindle,
   a nut rotatably connected to the spindle,
   wherein said spindle functions as a rotating drive unit exerting a force in an axial direction of the spindle directly on an area of the spindle that is operatively connected to the nut to thereby apply a rotating force to the nut and linearly move the spindle, and wherein the spindle is pre-stressed in an axial spindle separation direction and there is a complete separation between the nut and the spindle after rotation of said nut.

15. Linear operating device according to claim 14, wherein the spindle is extensible while subject to a pre-stress.

16. Linear operating device according to claim 14, wherein the nut has an operative connection with the spindle via rolling bodies.

17. Linear operating device according to claim 14, wherein the nut is connected rotatably fixed to a first lock device which is connectable, detachably and rotatably fixedly, to a complementary lock device.

18. Linear operating device according to claim 17, wherein the first lock device has a projection or a recess on a surface, and wherein the complementary lock device has a form which is complementary to the projection or the recess.

* * * * *